(12) United States Patent
Tontsch et al.

(10) Patent No.: US 11,914,173 B2
(45) Date of Patent: Feb. 27, 2024

(54) REFLECTOR FOR A VEHICLE FOR DISPLAYING AT LEAST ONE SYMBOL, VEHICLE AND PRODUCTION METHOD

(71) Applicant: AUDI AG, Ingolstadt (DE)

(72) Inventors: Friedrich-Uwe Tontsch, Ingolstadt (DE); Benjamin Ettenhuber, Feucht (DE)

(73) Assignee: Audi AG, Ingolstadt (DE)

( * ) Notice: Subject to any disclaimer, the term of this patent is extended or adjusted under 35 U.S.C. 154(b) by 708 days.

(21) Appl. No.: 17/043,974

(22) PCT Filed: May 8, 2019

(86) PCT No.: PCT/EP2019/061836
§ 371 (c)(1),
(2) Date: Sep. 30, 2020

(87) PCT Pub. No.: WO2019/219481
PCT Pub. Date: Nov. 21, 2019

(65) Prior Publication Data
US 2021/0364679 A1 Nov. 25, 2021

(30) Foreign Application Priority Data
May 15, 2018 (DE) .......... 102018207452.6

(51) Int. Cl.
*G02B 5/124* (2006.01)
*B60Q 1/30* (2006.01)
(Continued)

(52) U.S. Cl.
CPC ............... *G02B 5/124* (2013.01); *B60Q 1/30* (2013.01); *B60Q 1/301* (2022.05); *B60Q 1/503* (2013.01); *G02B 5/045* (2013.01)

(58) Field of Classification Search
CPC .......... G02B 5/124; G02B 5/045; B60Q 1/30; B60Q 1/301; B60Q 1/503
See application file for complete search history.

(56) References Cited

U.S. PATENT DOCUMENTS 5,759,468 A * 6/1998 Smith .................... G02B 5/124
264/19
8,950,877 B2 * 2/2015 Northey ................ G02B 5/124
359/530

(Continued)

FOREIGN PATENT DOCUMENTS

CN 202795957 U 3/2013
CN 203611855 U 5/2014

(Continued)

OTHER PUBLICATIONS

International Preliminary Report on Patentability directed to related International Patent Application No. PCT/EP2019/061836, completed Aug. 3, 2020, with attached English-language translation; 10 pages.

(Continued)

*Primary Examiner* — Euncha P Cherry
(74) *Attorney, Agent, or Firm* — Sterne, Kessler, Goldstein & Fox P.L.L.C.

(57) ABSTRACT

The invention relates to a reflector for a vehicle, which includes a main body having a plurality of reflection prisms arranged next to each other for each reflecting light. Each reflection prism has a reflection direction along which the reflection prism reflects the light. The main body has first reflection prisms having a first reflection direction and second reflection prisms having a second reflection direction different from the first reflection direction. The second reflection prisms form at least one symbol.

12 Claims, 4 Drawing Sheets

(51) Int. Cl.
G02B 5/04 (2006.01)
B60Q 1/50 (2006.01)

(56) References Cited

U.S. PATENT DOCUMENTS

| | | | |
|---|---|---|---|
| 10,682,878 B2 | 6/2020 | Lochbihler | |
| 2003/0184866 A1 | 10/2003 | Mimura et al. | |
| 2012/0229898 A1 | 9/2012 | Northey et al. | |
| 2017/0117530 A1* | 4/2017 | Choo | H01M 50/538 |

FOREIGN PATENT DOCUMENTS

| | | |
|---|---|---|
| CN | 104228669 A | 12/2014 |
| CN | 204577037 U | 8/2015 |
| DE | 19638610 A1 | 4/1997 |
| DE | 69620636 T2 | 11/2002 |
| DE | 10228013 A1 | 1/2004 |
| DE | 112007000208 T5 | 11/2008 |
| DE | 102014011425 A1 | 2/2016 |
| EP | 0724739 A1 | 8/1996 |
| EP | 2927715 A1 | 10/2015 |
| GB | 2305452 A | 4/1997 |
| WO | WO 9719820 A1 | 6/1997 |
| WO | WO 2007/083980 A1 | 7/2007 |

OTHER PUBLICATIONS

International Search Report and Written Opinion of the International Searching Authority directed to related International Patent Application No. PCT/EP2019/061836, dated Aug. 9, 2019, with attached English-language translation; 14 pages.

* cited by examiner

REFLECTOR FOR A VEHICLE FOR DISPLAYING AT LEAST ONE SYMBOL, VEHICLE AND PRODUCTION METHOD

TECHNICAL FIELD

The present invention relates to a reflector for a vehicle, including a main body, which has a plurality of reflection prisms arranged next to each other for each reflecting light, each reflection prism having a reflection direction along which the reflection prism reflects the light. The present invention also relates to a vehicle having at least one such reflector. Finally, the present invention relates to a method for producing a reflector for a vehicle.

BACKGROUND

Reflectors or retroreflectors that are installed in vehicles must achieve defined reflectance values for their approval. These guide values are determined in United Nations Economic Commission for Europe (ECE) Regulation No. 3 (ECE R3), Regulation No. 48 (R48), Regulation No. 104 (R104), as well as in SAE and CCC guidelines. If a front vehicle is illuminated with the headlights of another vehicle, the reflectors of the front vehicle reflect the light at the rear thereof. The largest part of the surface of the retroreflector "lights up," but this surface is undefined.

According to the prior art, the reflectors are produced by means of an injection molding method. For the production of the tool insert for the injection molding method, hexagonal pins which have a triple shape are usually first produced. Since the tolerance in the production of the pins is in the angular minute range, there is a relatively high reject rate. Subsequently, the pins are connected to form a package. The pen package is then galvanized. The electroplating steps are usually repeated multiple times, which results in high costs. The electroplated insert is then detached from the pen package and reworked. This electroplated insert then serves as a tool insert for the injection molding machine.

The respective reflectors have a plurality of reflection prisms, for example so-called triple prisms, on each of which the light is reflected. The respective reflection prisms have a reflection direction along which the light is reflected. The respective reflection prisms usually have the same reflection direction. Because of the very complex and cost-intensive production method, only absolutely necessary pins having different angles are created, which are used to produce the respective reflection prisms. For example, pins having different angles are produced if this is necessary due to the three-dimensional design of the reflector.

In this context, DE 102 28 013 A1 describes a partial transmission reflector in which the light transmission is limited to a specific light wave range due to the material used. This changes the reflection properties so that only light of a specific wavelength range that is invisible to the eye is reflected. The partial transmission reflector is used for an optical security system which is thereby able to distinguish its own reflections of a sensor beam coming from the partial transmission reflector from the external reflections which arrive from other reflective surfaces than the partial transmission reflector to be observed.

In addition, DE 10 2014 011 425 A1 describes a security element for producing documents of value. The security element provides at least one image, where the image is formed by a lattice structure which has a plurality of channel-shaped microcavities. The security element can have two regions in which the geometry of the lattice structure differs. For example, an aspect ratio of the microcavities can differ.

Furthermore, DE 696 20 636 T2 discloses an optical information carrier having a carrier film in the form of a composite laminate which includes at least three layers. Here, the central layer is a layer that allows the outer layer to be removed non-destructively. Furthermore, identical, microscopically fine relief structures are molded into an underside and upper side of a carrier film, which are covered with a base layer or cover layer in such a way that a pattern is visible in the detached state which is not visible in the non-detached state.

BRIEF DESCRIPTION OF THE DRAWINGS/FIGURES

DETAILED DESCRIPTION

Figure 1:
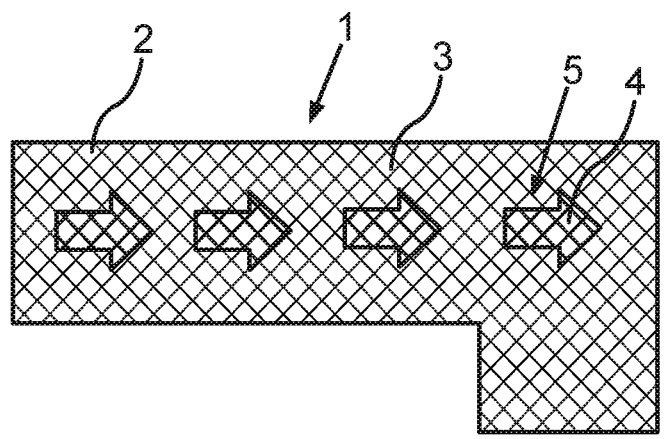
FIG. 1 illustrates an illuminated reflector having first reflection prisms and second reflection prisms where the second reflection prisms form symbols in the shape of arrows, according to some embodiments of this disclosure.

The object of the present invention is to provide a solution for how the production of a reflector for a vehicle of the type mentioned at the outset can be improved and thus the field of application of the reflector can be expanded.

According to the invention, this object is achieved by a reflector, by a vehicle, and by a method having the features according to the independent claims. Advantageous further developments of the present invention are specified in the dependent claims.

A reflector according to the invention for a vehicle includes a main body which has a plurality of reflection prisms arranged next to each other for the respective reflection of light. The respective reflection prisms each have a reflection direction along which they reflect the light. It is provided that the main body has first reflection prisms having a first reflection direction and second reflection prisms having a second reflection direction different from the first reflection direction. Furthermore, the second reflection prisms form at least one symbol.

The reflector, which can also be referred to as a retroreflector or back reflector, can be arranged at the rear of a vehicle. The reflector can also be part of a rear light of the vehicle. This reflector has the main body, which can be formed, for example, from a corresponding plastics material. This main body is shaped in such a way that it has the reflection prisms. These reflection prisms are arranged next to each other and/or one above the other within the main body. The respective reflection prisms can in particular be designed as a so-called triple prism, which has three surfaces at an angle of 90 degrees to one another.

According to a substantial aspect of the present invention, it is provided that the main body has first reflection prisms and second reflection prisms as the reflection prisms. The first reflection prisms have the first reflection direction along which they reflect the light. The second reflection prisms have the second reflection direction, which is different from the first reflection direction. The second reflection prisms form together a symbol. Because the reflection directions of the first reflection prisms and the second reflection prisms differ from one another, this symbol can be visible when the reflector is illuminated. Thus, on the one hand, the reflector can fulfill the function that the light is reflected by the reflector when it is illuminated. This can be done, for example, with the aid of the first reflection prisms. By means of the second reflection prisms, which reflect the light along the second reflection direction when illuminated, a symbol can be displayed when the reflector is illuminated. In particular, it is provided that an injection molding method is used to produce the main body, which has the first reflection prisms and the second reflection prisms. For this injection molding method, a tool is used which is produced by means of a milling method, in particular a precision milling method. In this way, it can be achieved that the second reflection prisms are inclined by a few angular minutes in comparison to the first reflection prisms. The functionality of the reflector can be expanded through this precise, cost-effective production method.

The first reflection direction and the second reflection direction are preferably determined in such a way that, when the reflector is illuminated, either the first reflection prisms or the second reflection prisms reflect the light to an observer depending on a viewing angle between the observer and the reflector. Due to the specific design, depending on the viewing angle of the reflector, another surface of the reflector can reflect the emitted light back to the observer or to a driver of a vehicle following. The surface or the symbol that is formed by the second reflection prisms stands out from the rest of the reflector or the first reflection prisms. Information can be introduced into the retroreflector through the second reflection prisms or these "interference reflectors."

In a further embodiment, the first reflection direction and the second reflection direction are determined in such a way that when the reflector is illuminated, either the first reflection prisms or the second reflection prisms reflect the light to the observer depending on a distance between the observer and the reflector. Depending on the distance between the reflector, an observer who is, for example, located in a vehicle that is approaching the vehicle with the reflector, can now be provided with different information from the different reflection prisms. The symbol can then be a warning symbol that indicates a predefined short distance between the vehicle with the reflector and the vehicle following. This allows distance information to be provided in a simple manner.

Furthermore, it is advantageous if the first reflection prisms surround the second reflection prisms at least in some regions. For example, the second reflection prisms that form the symbol can describe the closed region. If the first reflection prisms surround the second reflection prisms at least in some regions or completely, the symbol which is formed by the second reflection prisms can be perceived more clearly. The reflector can thus be better perceived by an observer. In addition, there is the possibility of corresponding design elements, such as a logo or a name of the manufacturer of the vehicle, being introduced into the reflector through the symbol.

In a further embodiment, the second reflection prisms form an arrow as the symbol. If the reflector is to be arranged, for example, on a rear right region of the vehicle, the arrow can point to the right. If the reflector is to be attached to a rear left region of the vehicle, this arrow can point to the left. An evasive maneuver can thus be displayed to an observer who is located in the vehicle with the reflector. In this way, road safety can be increased.

According to a preferred embodiment, the main body has at least third reflection prisms having a third reflection direction that differs from the first and second reflection direction, where the third reflection prisms form together a symbol. In addition to the first reflection prisms, which are used in a known manner to reflect the light, a plurality of further reflection prisms can be provided. For example, in addition to the second reflection prisms, the third reflection prisms, but also fourth, fifth, sixth, and so on, reflection prisms can be provided. The third reflection prisms differ from the second reflection prisms in the reflection direction. It can thus be achieved, for example, that depending on the viewing angle, either the first reflection prisms, the light reflected by the first reflection prisms, the light reflected by the second reflection prisms, or the light reflected by the third reflection prisms is perceived by an observer. In this way, information can be provided with the aid of the second and the at least third reflection prisms as a function of the viewing angle. For example, information about the viewing angle can be provided by the symbols which are provided by the respective reflection prisms. It can also be provided that distance information is provided by the symbols that are provided with the reflection prisms. For example, these symbols can then indicate a numerical value that describes the current distance between the observer and the reflector.

A vehicle according to the invention includes at least one reflector according to the invention. It can also be provided that the vehicle has a plurality of reflectors. For example, one of the reflectors can be arranged on the left rear region of the motor vehicle and one of the reflectors can be arranged on the right rear region. The vehicle is in particular a passenger car. The reflector can also be used for other vehicles and/or for trailers.

A method according to the invention is used to produce a reflector for a vehicle. In this case, a main body of the reflector is produced having a plurality of reflection prisms arranged next to each other for each reflecting light, where each reflection prism has a reflection direction along which the reflection prism reflects the light. The main body is produced in such a way that it has first reflection prisms having a first reflection direction and second reflection prisms having a second reflection direction different from the first reflection direction, where the second reflection prisms form at least one symbol.

The main body is preferably produced by an injection molding method using a tool, the tool being produced using a milling method. For example, a precision milling method can be used to produce the tool. Thus, compared to known production methods in which individual pins are connected to form packages and then an electroplated insert is manufactured, costs can be saved. In addition, the methods known from the prior art are environmentally harmful and time-consuming. Furthermore, the production of the tool by means of the milling method makes it possible to produce said different reflection prisms having said different reflection directions in a precise manner. For example, the first reflection direction can differ from the second reflection direction by a few angular minutes.

Furthermore, it is advantageous if the second reflection direction of the second reflection prisms is determined by means of a method for light simulation. In order to be able to determine the information more precisely with the aid of the symbol that is provided by the second reflection prisms as a function of the viewing angle and/or the distance, corresponding simulation methods can be used. For example, a calculation method for headlight and lamp reflector geometries, which is also referred to as CAL (Computer Aided Lighting), can be used for this purpose. CAD simulations can also be used. Thus, the second reflection direction can be ascertained in a precise manner.

The preferred embodiments presented with reference to the reflector according to the invention and their advantages apply accordingly to the vehicle according to the invention and the method according to the invention.

The invention also includes the combinations of the features of the described embodiments.

Figure 2:
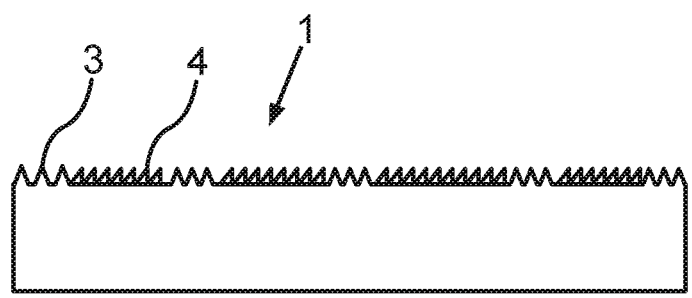
FIG. 2 illustrates a sectional side view of the reflector according to FIG. 1, according to some embodiments of this disclosure.
Figure 3:
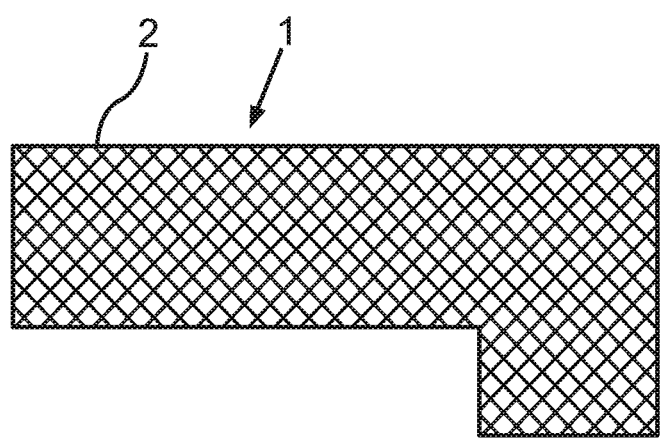
FIG. 3 illustrates the reflector according to FIG. 1 in a non-illuminated state, according to some embodiments of this disclosure.
Figure 4:
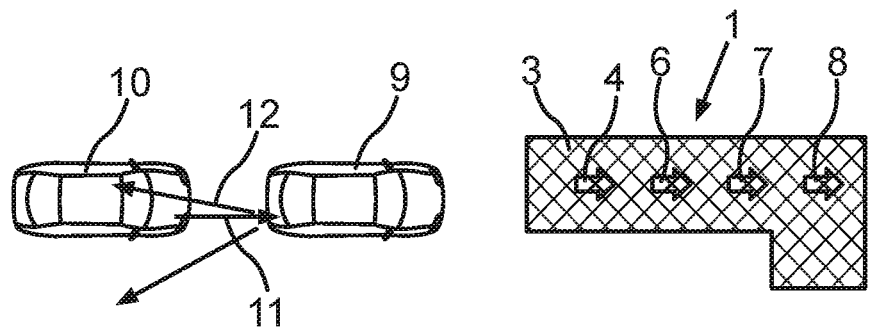
FIGS. 4-6 illustrate a reflector, which in addition to the first reflection prisms has further reflection prisms, which each form symbols in the shape of arrows and the reflection of the reflector for different angles, according to some embodiments of this disclosure.
Figure 5:
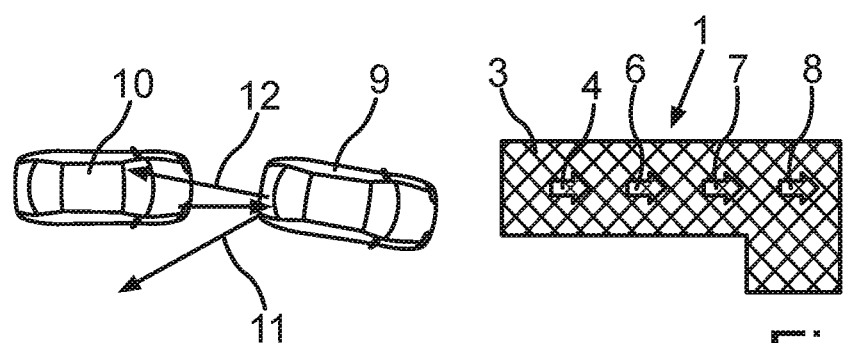
Figure 6:
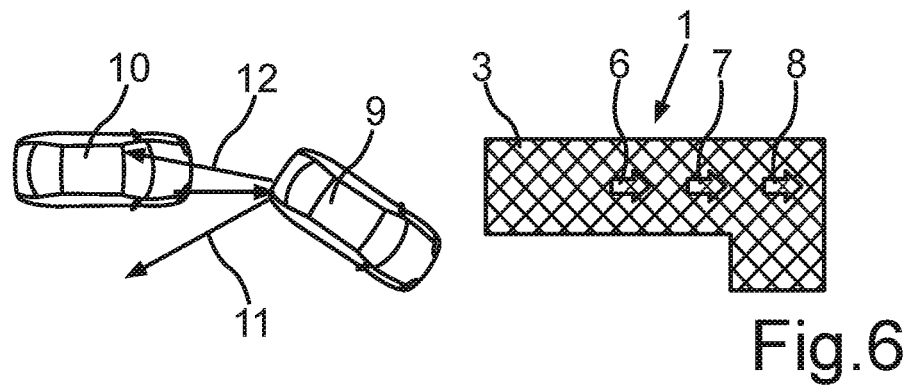
Figure 7:
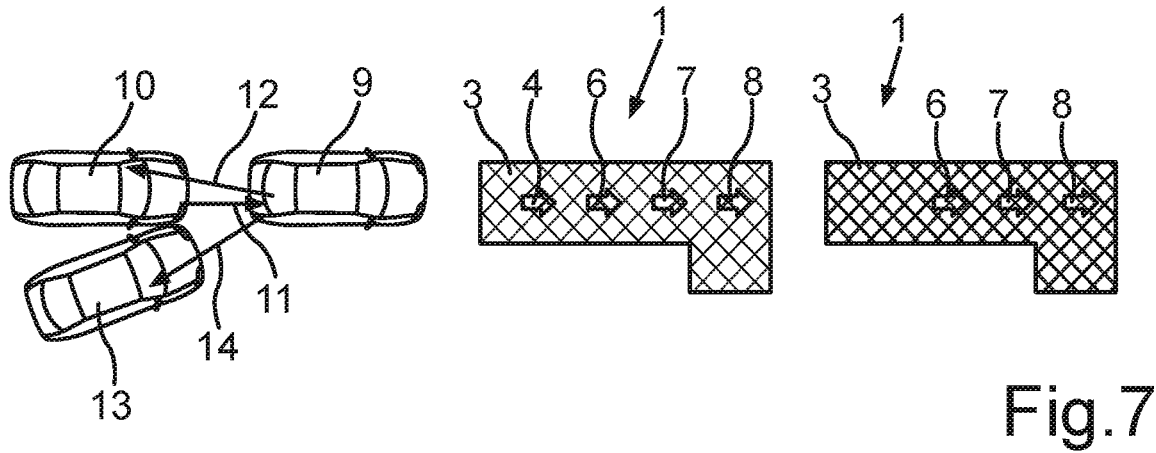
FIGS. 7-9 illustrate the reflection of the reflector according to FIG. 4 for different viewing angles based on different vehicles, according to some embodiments of this disclosure.
Figure 8:
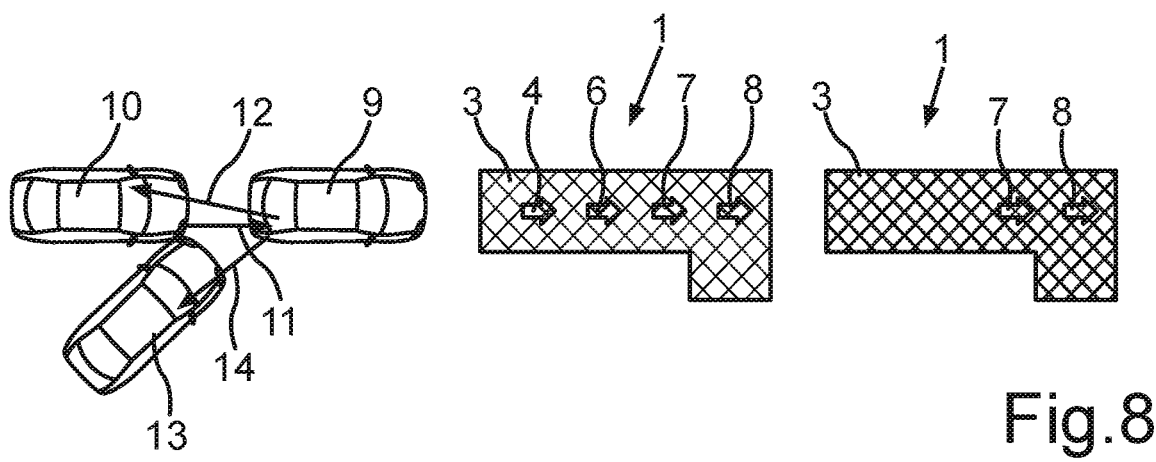
Figure 9:
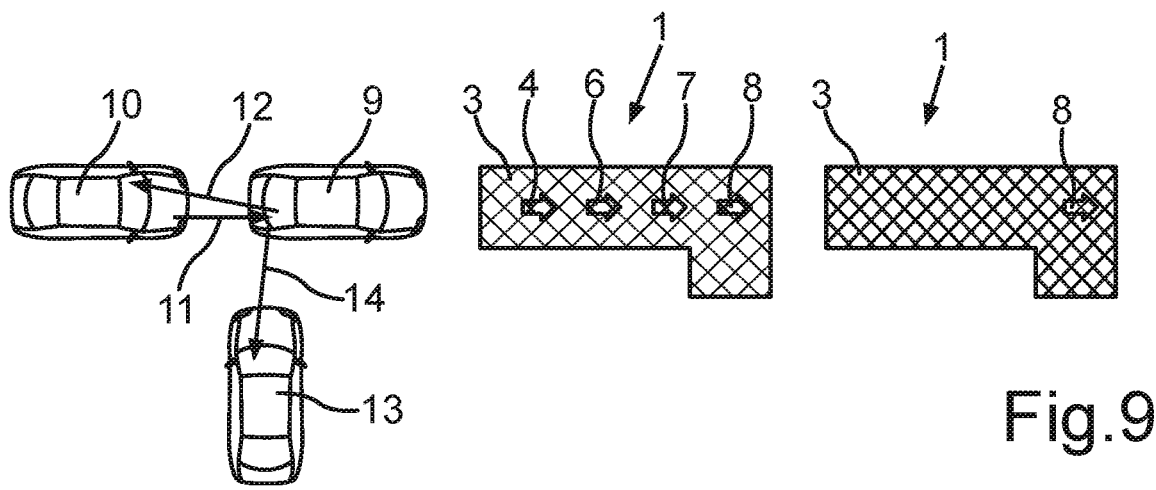

Embodiments of the invention are described below by way of example. In the drawings:

FIG. 1 shows an illuminated reflector having first reflection prisms and second reflection prisms where the second reflection prisms form symbols in the shape of arrows;

FIG. 2 is a sectional side view of the reflector according to FIG. 1;

FIG. 3 shows the reflector according to FIG. 1 in a non-illuminated state;

FIGS. 4 to 6 show a reflector according to a further embodiment, which in addition to the first reflection prisms has further reflection prisms which each form symbols in the shape of arrows and the reflection of the reflector for different angles;

FIGS. 7 to 9 show the reflection of the reflector according to FIG. 4 for different viewing angles based on different vehicles;

FIGS. 10 to 13 show reflectors according to further embodiments, where the second reflection prisms form different symbols.

The embodiments explained in the following are preferred embodiments of the invention. In the embodiments, the components of the embodiments that are described each constitute individual features of the invention to be considered independently of one another, which individually also further develop the invention independently of one another and are thus also to be considered part of the invention both individually and in a combination that is different from the combination described. In addition, the embodiments described may also be supplemented by further features of the invention which have already been described.

In the figures, the same reference signs refer to functionally identical elements.

FIG. 1 shows a reflector 1 according to an embodiment of the invention in a schematic representation. The reflector 1 includes a main body 2, which can be made from a plastics material, for example. This main body 2 can be manufactured with the aid of an injection molding method using a tool. This tool is produced in particular by a milling method. The main body 2 has first reflection prisms 3 and second reflection prisms 4, which are indicated schematically in the present case. Each reflection prism 3, 4 is in particular a so-called triple prism. In this case, the second reflection prisms 4 form symbols 5. In the present case, the symbols 5 are arrows.

The first reflection prisms 3 have a first reflection direction and the second reflection prisms 4 have a second reflection direction. This is indicated in FIG. 2, which shows a sectional view of the reflector 1 according to FIG. 1. The first reflection direction can differ from the second reflection direction, for example by a few angular minutes. Depending on the viewing angle, in the case of an illuminated reflector 1, either the first reflection prisms 3 or the second reflection prisms 4 can reflect the light to an observer. In the example of FIG. 1, the first reflection prisms 3 reflect the light to the observer and the second reflection prisms 4 appear dark to the observer, whereby the symbols 5 become visible. In a non-illuminated state of the reflector 1, which is shown in FIG. 3, the symbols 5 cannot be seen.

Due to the fact that the respective reflection prisms 3, 4 can be precisely produced, it can be provided that, in addition to the second reflection prisms 4, further reflection prisms 6, 7, 8 are provided, which each form symbols 5. FIG. 4 shows a reflector 1 according to a further embodiment which, in addition to the first reflection prisms 3, has the second reflection prisms 4 and also third reflection prisms 6, fourth reflection prisms 7, and fifth reflection prisms 8. The second reflection prisms 4, the third reflection prisms 6, the fourth reflection prisms 7, and the fifth reflection prisms 8 each form a symbol 5 in the shape of an arrow. In addition, FIG. 4 shows a vehicle 9 or the own vehicle on which the reflector 1 is arranged. In addition, a second vehicle 10 is shown, which is located behind the vehicle 9 in the direction of travel. The second vehicle 10 illuminates the reflector 1 with its headlight. This is illustrated here by the arrow 11. In the example of FIG. 4, both vehicles 9, 10 are flush so as to be parallel to one another. The light is reflected along the arrow 12 to an observer or driver of the second vehicle 10 by the reflector 1. In the present example, the light from the first reflection prisms 3 is reflected to the driver of the second vehicle 10.

FIG. 5 shows an example in which the vehicle 9 and the second vehicle 10 are at a small angle to one another. By changing the viewing angle, a different image of the reflector 1 is reflected. In this case, symbols 5 formed by the second reflection prisms 4, the third reflection prisms 6, the fourth reflection prisms 7, and the fifth reflection prisms 8 reflect the light to the driver of the second vehicle 10. FIG. 6 shows an example in which the angle between the vehicle 9 and the second vehicle 10 is increased in comparison with FIG. 5. In this case, the third reflection prisms 6, the fourth reflection prisms 7, and the fifth reflection prisms 8 reflect the light to the driver, whereby the right three symbols 5 or the arrows are visible to the driver.

FIG. 7 shows a further example in which, in addition to the second vehicle, a third vehicle 13 is also arranged behind the vehicle 9 in the direction of travel. In this case, the reflector 1 is also illuminated by the headlight of the second vehicle 10 (arrow 11). In this case, the arrow 12 also describes the light that is reflected to the driver of the second vehicle 10. Furthermore, the arrow 14 describes the light that is reflected towards the driver of the third vehicle 13. In FIGS. 7 to 9, the reflector 1 is shown in the middle as it is perceived by the driver of the second vehicle 10, and on the right side, the reflector 1 is shown as it is perceived by the driver of the third vehicle 13. This creates a different reflection image for the driver of the second vehicle 10 than for the driver of the third vehicle 13 since the latter perceives the reflector 1 from a different viewing angle. If the position or the angle of the third vehicle 13 changes further, the reflection image which the driver of the third vehicle perceives also changes. This is illustrated with reference to FIGS. 8 and 9.

Figure 10:
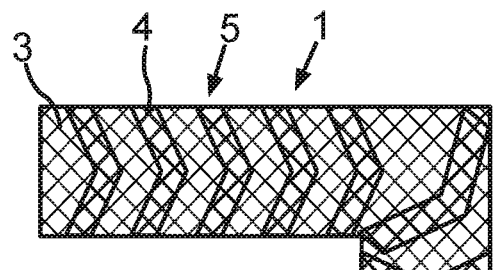
FIGS. 10-13 illustrate reflectors where the second reflection prisms form different symbols, according to some embodiments of this disclosure.
Figure 11:
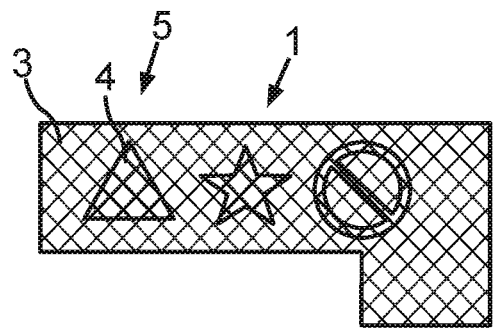
Figure 12:
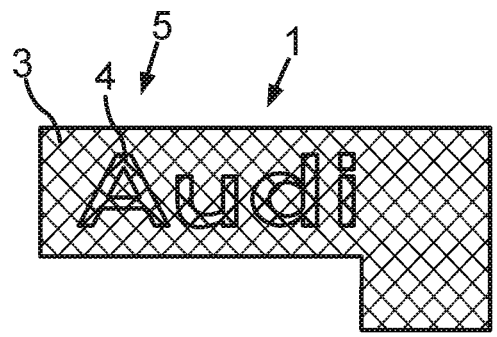
Figure 13:
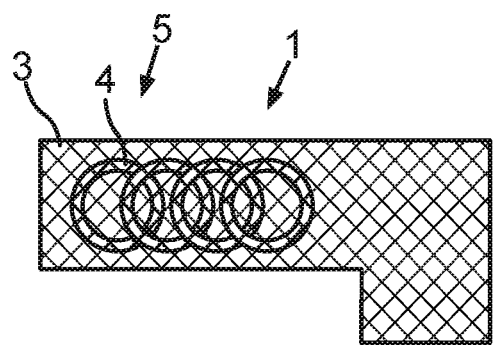

FIG. 10 shows a reflector 1 according to a further embodiment. This reflector 1 also has first reflection prisms 3 and second reflection prisms 4. The second reflection prisms 4 form respective symbols in the shape of arrows. FIG. 11 shows a reflector 1 according to a further embodiment, which has both first reflection prisms 3 and second reflection prisms 4. Different symbols 5 which can be formed by the second reflection prisms 4 are shown here by way of example. The examples in FIGS. 12 and 13 show further symbols 5 which can be formed by the second reflection prisms 4. In this case, the example from FIG. 12 shows the name of the vehicle manufacturer and FIG. 13 shows a symbol or logo of the vehicle manufacturer or the applicant.

The invention claimed is:

1. A vehicle, comprising:
a reflector comprising a main body comprising:
first reflection prisms having a first reflection direction along which the first reflection prisms reflect a light;
second reflection prisms having a second reflection direction along which the second reflection prisms reflect the light,
wherein the second reflection direction is different from the first reflection direction,
wherein the first and second reflection prisms are arranged next to each other,
wherein the second reflection prisms form at least one first symbol,
wherein the reflector is arranged at a rear of the vehicle or is part of a rear light of the vehicle, and
wherein the first reflection direction and the second reflection direction are determined in such a way that, when the reflector is illuminated, either the first reflection prisms or the second reflection prisms reflect the light to an observer depending on a viewing angle and a distance between the observer and the reflector; and
at least third reflection prisms having a third reflection direction that differs from the first and second reflection directions, wherein the at least third reflection prisms form together at least one second symbol.

2. The vehicle according to claim 1, wherein the first reflection prisms surround the second reflection prisms at least in some regions.

3. The vehicle according to claim 1, wherein the second reflection prisms form an arrow as the at least one first symbol or the at least one second symbol.

4. The vehicle according to claim 1, wherein the main body is produced using an injection molding technique.

5. The vehicle according to claim 1, wherein the main body is produced using an injection molding technique using a tool produced using a milling technique.

6. The vehicle according to claim 5, wherein the injection molding technique comprises a precision milling technique.

7. A reflector for a vehicle, the reflector comprising:
a main body comprising:
first reflection prisms having a first reflection direction along which the first reflection prisms reflect a light;
second reflection prisms having a second reflection direction along which the second reflection prisms reflect the light,
wherein the second reflection direction is different from the first reflection direction,
wherein the first and second reflection prisms are arranged next to each other,
wherein the second reflection prisms form at least one first symbol,
wherein the reflector is arranged at a rear of the vehicle or is part of a rear light of the vehicle, and
wherein the first reflection direction and the second reflection direction are determined in such a way that, when the reflector is illuminated, either the first reflection prisms or the second reflection prisms reflect the light to an observer depending on a viewing angle and a distance between the observer and the reflector; and
at least third reflection prisms having a third reflection direction that differs from the first and second reflection directions, wherein the at least third reflection prisms form together at least one second symbol.

8. The reflector according to claim 7, wherein the first reflection prisms surround the second reflection prisms at least in some regions.

9. The reflector according to claim 7, wherein the second reflection prisms form an arrow as the at least one first symbol or the at least one second symbol.

10. The reflector according to claim 7, wherein the main body is produced using an injection molding technique.

11. The reflector according to claim 7, wherein the main body is produced using an injection molding technique using a tool produced using a milling technique.

12. The reflector according to claim 11, wherein the injection molding technique comprises a precision milling technique.

* * * * *